United States Patent
Stahl et al.

(10) Patent No.: US 11,609,172 B2
(45) Date of Patent: Mar. 21, 2023

(54) DEVICE AND SYSTEM FOR DETECTING PARTICLES IN AIR

(71) Applicant: IMEC VZW, Leuven (BE)

(72) Inventors: Richard Stahl, Rotselaar (BE);
Abdulkadir Yurt, Heverlee (BE);
Ziduo Lin, Heverlee (BE); Geert Vanmeerbeeck, Keerbergen (BE);
Andy Lambrechts, Herent (BE)

(73) Assignee: IMEC VZW, Leuven (BE)

( * ) Notice: Subject to any disclaimer, the term of this patent is extended or adjusted under 35 U.S.C. 154(b) by 56 days.

(21) Appl. No.: 17/128,093

(22) Filed: Dec. 19, 2020

(65) Prior Publication Data
US 2021/0190660 A1 Jun. 24, 2021

(30) Foreign Application Priority Data

Dec. 20, 2019 (EP) ..................................... 19218700

(51) Int. Cl.
*G01N 15/02* (2006.01)
*G03H 1/08* (2006.01)
*G03H 1/04* (2006.01)

(52) U.S. Cl.
CPC ..... *G01N 15/0227* (2013.01); *G01N 15/0211* (2013.01); *G03H 1/0443* (2013.01);
(Continued)

(58) Field of Classification Search
CPC .......... G01N 15/0227; G01N 15/0211; G01N 2015/0233; G01N 15/1475; G01N 15/147;
(Continued)

(56) References Cited

U.S. PATENT DOCUMENTS

2012/0148141 A1  6/2012  Ozcan et al.
2012/0182548 A1  7/2012  Harb et al.
(Continued)

FOREIGN PATENT DOCUMENTS

CN      105891065 A       8/2016
WO   WO-2019075409 A1    4/2019
WO   WO-2019/236569 A1  12/2019

OTHER PUBLICATIONS

Berg et al., "Digital holographic imaging of aerosol particles in flight", Journal of Quantitative Spectroscopy and Radiative Transfer, vol. 112, Issue 11, pp. 1776-1783, https://doi.org/10.1016/iijgsrt.2011.01.013, Jul. 2011.
(Continued)

*Primary Examiner* — Michael P LaPage
(74) *Attorney, Agent, or Firm* — Moser Taboada

(57) ABSTRACT

A device for detecting particles in air; said device comprising:
 a flow channel configured to allow a flow of air comprising particles through the flow channel;
 a light source configured to illuminate the particles, such that an interference pattern is formed by interference between light being scattered by the particles and non-scattered light from the light source;
 an image sensor configured to detect incident light, detect the interference pattern, and to acquire a time-sequence of image frames, each image frame comprising a plurality of pixels, each pixel representing a detected intensity of light; and
 a frame processor configured to filter information in the time-sequence of image frames, wherein said filtering comprises:
identifying pixels of interest in the time-sequence of image frames, said pixels of interest picturing an interference pattern potentially representing a particle in the flow of air, and
(Continued)

outputting said identified pixels of interest for performing digital holographic reconstruction.

11 Claims, 4 Drawing Sheets

(52) U.S. Cl.
CPC ... *G03H 1/0866* (2013.01); *G01N 2015/0233* (2013.01); *G03H 2001/0883* (2013.01)

(58) Field of Classification Search
CPC ......... G01N 2015/1454; G03H 1/0866; G03H 2001/0883; G03H 1/0443; G06V 20/69; G06T 7/254
See application file for complete search history.

(56) References Cited

U.S. PATENT DOCUMENTS

| | | | |
|---|---|---|---|
| 2016/0305872 A1* | 10/2016 | Kaye | G01N 15/14 |
| 2017/0153106 A1 | 6/2017 | Ozcan et al. | |
| 2017/0205222 A1 | 7/2017 | Mathuis et al. | |
| 2017/0322516 A1* | 11/2017 | Hsiao | G03H 1/0866 |
| 2018/0189963 A1 | 7/2018 | Joly et al. | |
| 2018/0321128 A1 | 11/2018 | Harriman et al. | |
| 2018/0322660 A1 | 11/2018 | Smith | |
| 2019/0250559 A1* | 8/2019 | Hamalainen | G01N 21/453 |

OTHER PUBLICATIONS

Kiselev et al., "A flash-lamp based device for fluorescence detection and identification of individual pollen grains", Review of Scientific Instruments 84, 033302, http:s//doi.org/10.1063/1.4793792, 2013.

Allier et al., "Lensfree video microscopy: high throughput monitoring and cell tracking of 2D cell cultures", Progress in Biomedical Optics and Imaging, SPIE—International Society for Optical Engineering, Bellingham, WA, US, vol. 9536, pp. 95360J-95360J, Jul. 16, 2015.

Crouzy et al., "All-optical automatic pollen identification: Towards an operational system", Atmospheric Environment, vol. 140, pp. 202-212, https://doi.org/10.1016/l.atmosenv.2018.05.062. Sep. 2016.

Jo et al., "Holographic deep learning for rapid optical screening of anthrax spores"; Science Advances, vol. 3, No. 8, e1700606, DOI: 10.1126/sciadv.1700606, Aug. 4, 2017.

Subedi et al., "Contact-free microparticle characterization via Raman spectroscopy and digital holography", Journal of Optics, vol. 20, No. 9, 095608, https://doi.org/10.1088/2040-8988/aada5d, Aug. 27. 2018.

Yang et al., "Portable Rice Disease Spores Capture and Detection Method Using Diffraction Fingerprints on Microfluidic Chip". Micromachines, 10, 289, https.//doi.org/10.3390/mi10050289, 2019.

Wu et al., "Deep-learning enabled label-free bio-aerosol sensing using mobile microscopy" (Conference Presentation): Proceedings vol. 10890, Label-free Biomedical Imaging and Sensing (LBIS) 2019; 108901Z (2019) https://doi.org/10.1117/12.2507591, Event: SPIE BiOS, San Francisco, California, United States, Mar. 4, 2019.

Extended European Search Report for Application No. EP 19218700. 3, dated Jun. 24, 2020.

Yichen Wu, et al., "Lensless digital holographic microscopy and its applications in biomedicine and environmental monitoring"; Article in Press; Methods 136 (2017); http://dx.doi.org/10.1016/j.ymeth.2017.08.013; pp. 1-13.

Yi-Chen Wu, et al., "Air quality monitoring using mobile microscopy and machine learning"; Light: Science & Applications (2017); pp. 1-12.

* cited by examiner

DEVICE AND SYSTEM FOR DETECTING PARTICLES IN AIR

CROSS-REFERENCE TO RELATED APPLICATION

The present application is based on priority claimed on European Patent Application No. 19218700.3, filed on Dec. 20, 2019, the contents of which are incorporated herein by reference.

TECHNICAL FIELD

The present inventive concept generally relates to detection of particles in air, and in particular to detection of pollen in air.

BACKGROUND

Interior and exterior air quality is of increasing interest globally. In some instances, monitoring exterior air quality of pollens or dust, or other pollutants is of great interest. Interior air quality, including the presence of molds, fungi, pollen, dust, or living organisms, such as bacteria, is also of growing interest. For example, allergic reactions to airborne pollen is an increasing problem. Therefore, pollen measurements are being carried out and reported, e.g. together with weather reports.

Pollen may be collected using e.g. Hirst samplers or Bertin Coriolis air samplers. Hirst samplers use an adhesive tape to capture pollen from the air while Bertin Coriolis air samplers transfer pollen to a liquid. In both cases the samples are then manually removed and analyzed, e.g. using standard optical microscopy.

Due to the way the information is obtained, and the manual efforts required to analyze measurements, there is currently a significant delay in acquiring pollen information. Moreover, the number of measurement locations is limited due to the high cost of pollen measurement equipment.

Having technology to drastically increase the amount of compact pollen measurement stations at a low cost but with the ability to execute fully automated measurements at a higher frequency (e.g. several times per day) would have the potential of providing more up-to-date and geographically more precise information on pollen levels in the air. This information would be valuable to people that are affected by pollen allergies, as it could be used on a much more local scale and specific for every individual as an indicator to reduce the consumption of antihistamine and thereby reducing the side-effects of these drugs, such as sedation, drowsiness, and insomnia.

Automated aerosol particle detectors have been developed, as reviewed by Kiselev et al. [Review of Scientific Instruments 84, 033302 (2013)]. Such particle detectors suck in ambient air, including aerosols, and expel the air through a special nozzle. Various light sources are focused at the nozzle outlet. As an aerosol in the flow passes the focal point of the light, it is recognized by the concomitant scattering detected by two photomultiplier tubes equipped with tailored bandpass filters. In addition to light scattering detection, the automated aerosol particle detectors may furthermore detect a fluorescence signal. Although present automated aerosol particle detectors are fully functional, there is still room for improvement.

In terms of monitoring interior air quality with respect to bacteria, for example, the current art requires physical sample collection of a collection device (i.e. Petri dish with a media conducive to bacterial growth) that is placed in an environment and exposed for a given time duration, collected and viewed under a lens (microscope) using standard optical microscopy by a skilled technician, for example.

SUMMARY

It is an objective of the invention to provide an automated device for detecting particles in air. It is a further objective to facilitate that particles may be determined as particles of interest (e.g. pollen or bacteria). It is a further objective of the invention that the device is accurate, robust, and inexpensive. The device is hereinafter primarily described as a device for detecting pollen in air. However, it should be understood that the device may also be used for detecting other types of particles, e.g. mold, fungi, bacteria, dust, dirt, soot, or smoke.

These and other objectives of the invention are at least partly met by the invention as defined in the independent claims. Preferred embodiments are set out in the dependent claims.

According to a first aspect of the invention, there is provided a device for detecting particles in air; said device comprising:

a flow channel comprising an inlet and an outlet, wherein the flow channel is configured to allow a flow of air comprising particles through the flow channel from the inlet to the outlet;

a light source configured to illuminate the particles in the flow of air, such that an interference pattern is formed by interference between light being scattered by the particles and non-scattered light from the light source;

an image sensor comprising a plurality of photo-sensitive elements configured to detect incident light, the image sensor being configured to detect the interference pattern, and wherein the image sensor is configured to acquire a time-sequence of image frames, each image frame comprising a plurality of pixels, each pixel representing an intensity of light as detected by a photo-sensitive element of the plurality of photo-sensitive elements; and a frame processor configured to filter information in the time-sequence of image frames, wherein said filtering comprises:

identifying pixels of interest in the time-sequence of image frames, said pixels of interest picturing an interference pattern potentially representing a particle in the flow of air, and outputting said identified pixels of interest for performing digital holographic reconstruction on the identified pixels of interest.

It is a realization of the invention that an image sensor facilitates imaging based on light scattering from a particle, in contrast to merely detecting the existence and/or magnitude of light scattering from a particle. A device according to the inventive concept may therefore have several advantages over automated aerosol particle detectors such as the ones disclosed by Kiselev et al.

Detecting particles using an image sensor may make it possible to differentiate between different types of particles according to their morphology. For example, if the objective is to measure pollen in air, pollen may be differentiated from soot particles by the particle shape. False positive results may thereby be avoided. Imaging may be a more effective and inexpensive way to differentiate between particle types than e.g. fluorescence spectroscopy. It may even be possible to differentiate between very similar particles, e.g. differentiating different types of pollen from each other.

Detecting particles using an image sensor which detects particles in a passing flow may make the detection accurate as the image sensor may detect particles in a large volume of a passing flow. In contrast, if the particle signal is picked up from a single focal point of a passing flow, a smaller volume may be investigated which may result in larger statistical error margins.

It is a further realization of the invention that forming an interference pattern by interference between light being scattered by the set of particles and non-scattered light, and subsequently detecting said interference pattern with an image sensor, may facilitate several advantages over conventional imaging/microscopy devices. A device according to the inventive concept may e.g. work according to the principles of digital holographic imaging.

The non-scattered light from the light source may be passed along a common optical path with the light being scattered by the particles. Thus, the interference pattern may be formed within a wavefront passing the particles and the particle sample carrier in a so-called in-line holography set-up. However, according to an alternative, the non-scattered light may be passed along a separate reference light path, which is combined with the light having been scattered by the particles for reaching the image sensor. In such case, the light scattered by the particles may be either forward or backward scattered light.

A device according to the inventive concept may be accurate. The interference pattern detected by the image sensor may be converted to an image and the image may reveal the morphology of the particle. Furthermore, a device according to the inventive concept may measure a larger volume of a passing flow than a conventional imaging/microscopy device. As mentioned, a larger measured volume may result in a higher statistical accuracy. The device may have a large field of view. For example, digital holographic imaging devices may have a larger field of view than conventional imaging/microscopy devices. A large field of view may mean that a large lateral extension of the flow channel may be measured. The device may also have a large depth of focus. For example, digital holographic imaging devices may have a larger depth of focus than conventional imaging/microscopy devices. A large depth of focus may mean that a deeper flow channel may be measured.

A device according to the inventive concept may be inexpensive. As the device may be implemented according to the principles of digital holographic imaging either no lenses, fewer lenses, or less expensive lenses may be needed in comparison to conventional imaging/microscopy devices. A high-quality lens or collection of lenses, e.g. a microscope objective, may be very costly.

A device according to the inventive concept may be compact. As the device may be implemented according to the principles of digital holographic imaging it may be more compact than conventional imaging/microscopy devices. Using lenses for projecting an image on an image sensor may require a lot of space, especially if a large field of view is required.

A device according to the inventive concept may be robust. If conventional microscopy imaging had been implemented in an automated device in the field it would most likely be very sensitive. For example, due to the small depth of focus, a microscope objective would most likely be sensitive to perturbations moving the focal point, e.g. due to temperature fluctuations or knocks to the device. In contrast, a device according to the inventive concept may be less sensitive to such perturbations.

It is a further realization of the invention that imaging particles in a flow, may generate large amounts of data which need to be processed and/or transferred. As data processing may be time consuming, the flow rate, and thereby the volume of air that can be measured per time unit, may be limited by the processing power available. This may be especially true in the case of digital holographic imaging wherein the image is reconstructed from the interference pattern. Furthermore, data transfer rates may be limited by available bandwidth. Thus, although detecting an interference pattern rather than just detecting scattered light from the particles may make it possible to cover a larger volume of air in each image frame at a low cost, these advantages may perhaps not be utilized fully if for example each image frame in the time-sequence of image frames is subjected to full digital holographic reconstruction. Should each image frame be subjected to full digital holographic reconstruction, the volumetric flow rate of the flow of air may need to be low and/or investments in processing resources and bandwidth may need to be large.

It is a further realization of the invention that filtering information or data may be easier than processing information or data. Thus, by identifying pixels of interest and outputting said identified pixels of interest, requirements on processing resources and bandwidth may be relieved and digital holographic reconstruction on pixels that potentially represent a particle may be performed faster.

It should be understood that the "particles" referred to in the present disclosure may be pollen, but may also be any other type of air-borne particulate matter such as soot, air-borne bacteria, or fungi. Furthermore, the set of particles collected in the liquid may be all particles from the flow of air or a subset of the particles from the flow of air.

The terms "inlet" and "outlet" of the flow channel refers to any unit, device, or element arranged to allow a flow of air to pass through it. The "inlet" and "outlet" may be openings connecting the flow channel to the ambient air surrounding the device. However, the "inlet" and "outlet" may be openings connecting the flow channel to other channels, e.g. when the device is part of a larger system.

It should be understood that the light source may be configured to emit pulsed light. An advantage of using pulsed light may be that motion blur due to object movement during image acquisition may be avoided. Alternatively, the light source may be configured to emit continuous light. It should be understood that the light may be light within the visible range or outside the visible range.

By the term "image sensor" is here meant any light sensor with a plurality of photo-sensitive elements, each configured to detect incident light. Given only as examples, the image sensor may be, but is by no means limited to, a charge-coupled device (CCD) or a complementary metal-oxide-semiconductor (CMOS) image sensor. It should also be understood that the image sensor may be configured to detect a time series of changing interference patterns of the set of particles in the flow channel, e.g. as particles passes the image sensor.

It should be understood that the frame processor may be any type of processor, e.g. a computer processor executing the instructions of one or more computer programs in order to filter the information in the time-sequence of image frames. The frame processor may e.g. be an image processor, a microprocessor or a field-programmable gate array. It may be advantageous with a frame processor in close proximity to the image sensor to avoid transferring data over long distances. The frame processor and the image sensor may be implemented as a system on a chip. The frame processor may output the identified pixels of interest in any manner for transferring the identified pixels of interest to digital holographic reconstruction. Digital holographic reconstruction may be performed on a common processing unit which also implements the frame processor, such that the identified pixels of interest may be transferred to a different thread on the same processing unit. Alternatively, the identified pixels of interest may be transferred in any manner, such as through wired or wireless communication to a unit that performs digital holographic reconstruction.

The identified pixels of interest in the time-sequence of image frames may be entire image frames. For example, if some image frames appear to represent no particles, then these image frames may be filtered out. The identified pixels of interest in the time-sequence of image frames may, alternatively or additionally, be one or more clusters of pixels within an image frame. For example, if most pixels within an image frame appear to represent no particles, except for a cluster of pixels which do appear to represent a particle, then the cluster of pixels may be filtered out and the other pixels discarded. It should be understood that pixels may be identified as pixels of interest even if they appear not to represent any particles. For example, pixels appearing not to represent a particle but being in the vicinity of pixels that do appear to represent particles may also be of interest and identified accordingly.

Pixels not identified as pixels of interest may not be subjected to further processing. The process of checking whether pixels are of interest or not may be a process which requires less resources than digital holographic reconstruction. Thus, requirements on processing resources may be relieved. This may be especially true if the particle concentration is very low, such as pollen concentrations in air may be. Once the pixels of interest have been identified digital holographic reconstruction may be performed. Digital holographic reconstruction may make it possible to conclusively determine if the pixels of interest represented a particle or not.

The light source may be configured to emit at least partially coherent light. Coherent light may be advantageous at it may improve the interference visibility. A coherent light source may be a laser. However, it should be understood that also partially coherent light may provide an interference pattern with sufficient visibility. A partially coherent light source may e.g. be a light emitting diode which emits light directly onto the flow channel or through a pinhole onto the flow channel. A coherent light source may provide better interference visibility but be more expensive while a partially coherent light source may provide a worse interference visibility but be less expensive.

The device may further be configured such that:
the light source is arranged outside a first side wall of the flow channel;
the image sensor is arranged outside a second side wall of the flow channel; and
the flow channel is configured to provide a light path from the light source to the image sensor through the first side wall of the flow channel, through the flow of air in the flow channel and through the second side wall.

Such a configuration may be advantageous as it permits in-line holographic imaging. In-line holographic imaging may have the advantages previously mentioned in conjunction with holographic imaging. In-line holographic imaging may be particularly useful for imaging samples which are mainly transparent such as e.g. a flow carrying a dilute set of particles. In-line holographic imaging may provide a compact measuring setup compared to other holographic imaging measuring setups as the object light, i.e. the light being scattered by the set of particles, and the reference light, i.e. the non-scattered light from the light source, may share a common optical axis, i.e. the light path through the flow of air in the flow channel.

It should be understood that the first and second side wall of the flow channel may be transparent or partially transparent, at least at a wavelength of the light source.

It should be understood that the signal to noise ratio, SNR, of the detected interference pattern may decrease with increasing distance between the image sensor and the scattering particle. Thus, it may be advantageous if a distance between an inner surface of the first side wall of the flow channel and the image sensor is below a distance threshold, wherein the distance is a distance along the light path. The distance threshold may thus define the maximum length of the light path between a particle in the flow channel and the image sensor. The distance threshold may depend on the acceptable SNR. For example, if the objective is to detect any particle without differentiating between types of particles a lower SNR and a higher distance threshold may be acceptable. If the objective is to differentiate between types of particles, a higher SNR and a lower distance threshold may be necessary. If the objective is to differentiate between very similar particles a yet higher SNR and a yet lower distance threshold may be necessary. Examples of distance thresholds that are useful for various objectives are: 40 mm, 20 mm, 10 mm, and 5 mm.

In order to utilize as much as possible of the space between the image sensor and the distance threshold it may be advantageous for the image sensor to be placed at a distance of less than 5 mm from the inner surface of the second side wall of the flow channel. In another embodiment it may be advantageous for the image sensor to be placed at a distance of less than 2 mm from the inner surface of the second side wall of the flow channel.

The flow channel may be a flow channel in between the light source and the imaging sensor, wherein the depth of the flow channel is below the distance threshold, the depth herein referring to the extension of the flow channel in a direction defined by the direction of the light path. The flow channel may further have a width larger than the depth, the width herein referring to an extension orthogonal to the direction of the light path. It may be advantageous, although not necessary, to have a flow channel arranged such that the direction of the flow is essentially orthogonal to the optical axis of the illuminating light. It may be advantageous to have a light source emitting collimated light, the light may herein be an expanded and collimated laser beam. However, a diverging light beam, e.g. from a light emitting diode, may also be used.

The frame processor of the device may be configured to perform the identifying of pixels of interest in the time-sequence of image frames using a differential image process, the differential image process identifying a pixel as a pixel of interest if the intensity of light represented by the pixel has changed.

A change in intensity may be a sign of a particle passing by the image sensor while scattering light. A change in intensity may be an increase in intensity, e.g. due to constructive interference. A change in intensity may also be a decrease in intensity, e.g. due to destructive interference.

A pixel may be identified as a pixel of interest if the intensity of light represented by the pixel has changed compared to the intensity of the corresponding pixel in a preceding or succeeding image fame in the time-sequence. Alternatively, a pixel may be identified as a pixel of interest if the intensity of light represented by the pixel has changed compared to the intensity of the corresponding pixel in a standard reference image frame, e.g. an image frame not taken from the time-sequence of image frames.

Identifying a change in intensity may account for a fluctuating illumination intensity, e.g. by normalization. Before comparing intensities to identify a change in intensity, pixel values may e.g. be divided by a value corresponding to the illumination intensity at the time the image frame was acquired.

Differential image processes which identifies pixels based on changes in intensities may be available in movie compression algorithms, e.g. in data differencing algorithms or differential compression algorithms.

The differential image process may comprise:

receiving a first image frame from the time-sequence of image frames;

subtracting a reference frame from the first image frame to produce a differential image frame, each pixel of the differential image frame having an intensity related to a difference between the intensities of the corresponding pixels in the first image frame and the reference frame; and identifying pixels in the differential image frame which exceed a threshold as pixels of interest in the time-sequence of image frames.

The reference frame may herein be a preceding image frame, a succeeding image fame, or a standard reference frame. Pixels exceeding a threshold may be pixels with an intensity above a positive threshold value, below a negative threshold value or pixels wherein the absolute value of the intensity is above a positive threshold value.

The device may be further configured to set a relationship between a frame rate of the time-sequence of image frames and a velocity of the flow of air through the flow channel, wherein the relationship is set to control an overlap between consecutive frames in the time-sequence of image frames.

Consider image frames wherein one side of the image frame represent an upstream part of the flow of air and another side of the image frame represent a downstream part of the flow of air. If a particle is represented in the upstream part of an image frame and then again represented in the downstream part of a consecutive image frame the two image frames may be considered to have a positive overlap. Thus, some particles may be visible in two images. This may not mean that these particles are counted twice. As long as the overlap is known, double counting may be avoided. Some overlap may be beneficial as it may ensure that particles are not missed. It may also provide a measurement of the velocity of the flow. Zero overlap may also be used wherein a particle just entering the upstream part of an image frame will just have left the downstream part of the consecutive image frame. In such a configuration the image sensor may be utilized fully as particles may never be imaged twice while still ensuring that all particles may be detected. Such a configuration may however leave little room for e.g. fluctuations in the velocity of the flow of air.

According to a second aspect of the invention, there is provided a system for detecting particles in air, said system comprising:

a plurality of modules, each module comprising a device according to any one of the preceding claims;

a processor configured to collect data from each of the plurality of modules for post-processing.

Effects and features of this second aspect are largely analogous to those described above in connection with the first aspect. Embodiments mentioned in relation to the first aspect are largely compatible with the second aspect.

It may be advantageous to combine a plurality of modules in order to achieve a total volumetric flow rate which is high enough to give a result with sufficiently low error margins.

It should be understood that each module may have its own flow channel, light source, image sensor and frame processor. However, some components may be shared among the modules. In one example, two or more modules may share the same flow channel. In another example, two or more modules may share the same light source.

It may be advantageous with each module having its own image sensor, as large image sensors may be expensive and have a slow read out.

It may be advantageous with each image sensor having its own frame processor, wherein the frame processors of the system filter information from their respective image sensor and pass on the filtered information to the processor.

Alternatively, the system may comprise a plurality of frame processors, wherein each frame processor serve a subset of the image sensors of the system. Each frame processor may then filter information from its respective subset of image sensors and pass on the filtered information to the processor.

It should be understood that the processor may be one or more units which are separate from the frame processors, e.g. a central processing unit (CPU) or a multi-core CPU. The processor may also be a distributed processor, wherein the tasks of the processor are distributed over servers on the cloud. However, the processor may also be implemented in one of the frame processors or the tasks of the processor may be distributed over several frame processors.

It should be understood that the processor that collects data from each of the plurality of modules for post-processing may perform the task of compiling a measurement result representing the entire system, e.g. a particle concentration based on the data from all the image sensors of the system. It is a realization that it may be hard for a single processor to filter all the information from the different image sensors of the system and to compile a measurement result representing the entire system. This problem may be mitigated when a plurality of frame processors work in parallel to filter the information from the image sensors.

It should be understood that once pixels of interest are identified by one or more frame processors it may be of interest to perform a number of further processing steps, e.g.:

1. Performing digital holographic reconstruction on the pixels of interest to produce an image potentially representing a particle.
2. Comparing the image potentially representing a particle to one or more characteristics of particles.
3. Identifying the image as either representing or not representing a particle.
4. Counting identified images of particles.
5. Calculating a particle concentration based on counted identified images of particles and a volume of one or more flows of air.
6. Compiling a measurement result representing the entire system, based e.g. on the previous steps.

How the workload is distributed over the system may vary in numerous ways from one embodiment to another, as easily understood by the skilled person. The processor may be configured to perform any of the above processing steps. Thus, what constitutes "post-processing" may be different from one embodiment to another. Similarly, what constitutes "data collected by the processor" may be different from one embodiment to another.

For example, the processor may be configured to perform at least the first of the above processing steps. In this case, the data collected may be the pixels of interest from a plurality of modules.

In another example, the frame processors, or one or more units between the frame processor and the processor, may themselves perform the first of the above processing steps. In this case, the data collected may be images potentially representing particles. The processor may then perform the second processing step.

In another example, the frame processors, or one or more units between the frame processor and the processor, may themselves perform the second of the above processing steps. In this case, the data collected may be metadata representing a comparison of an image and characteristics of particles. The processor may then perform the third processing step.

It should further be understood that the processor may be configured to perform more than one, or all, of the remaining processing steps. It should also be understood that the processor may only perform a few of the steps and then leave the others to another unit. It should also be understood that all steps do not necessarily need to be performed.

It should also be understood that how the workload of the data processing is distributed between the processor and the frame processors may change dynamically. The frame processors may be configured to perform as much as possible of the processing steps and pass on remaining tasks to the processor. For example, some of the digital holographic reconstruction may be performed by the frame processors while the rest of the digital holographic reconstruction may be performed by the processor.

It should also be understood that a frame processor may perform the tasks of the processor in terms of data collection and post-processing. For example, the system may comprise a number of frame processors which all start by filtering information from the image sensors they serve. Thus, the filtered information may become more manageable to pass across the system if needed. When pixels of interest are identified by a certain frame processor it may start performing the digital holographic reconstruction. If a frame processor has too many interference patterns to handle it may pass on the corresponding pixels of interest to another frame processor which may continue the processing. Thus, what constituted the frame processor and the processor may change dynamically.

It should be understood that the different variations of data processing sharing between the frame processors and the processor may be combined with any other embodiment of this application, as readily understood by the skilled person.

The system may be configured to perform digital holographic reconstruction on the identified pixels of interest output by the frame processor, thereby transforming the pixels of interest from an interference pattern potentially representing a particle to an image potentially representing a particle.

The digital holographic reconstruction may be performed in the processor of the system. Alternatively, each frame processor may perform some or all digital holographic reconstruction on the identified pixels of interest originating from the frame processor filtering.

It should be understood that when referring to an "image" in the present disclosure, not merely a two-dimensional projection of a three-dimensional object is intended. Rather, it should be seen from a wider point of view in which a holographic reconstruction, being a three-dimensional representation of an object, in this case particles, is also regarded as an image. Further, within the field of digital image processing it is understood by a person skilled in the art that an "image" undergoing processing in e.g. a computer, is not necessarily the visually available representation of the image displayed on screen, but rather it may be the digital representation of the image inside the processor that is being processed. In fact, there is no requirement of providing any display of the image on screen for the processor to be able to carry out the processing of the image. On the contrary, when a processor performs processing of a large amount of images, it is likely to do so without displaying the images on screen. Hence in the present disclosure, included in the term "image" is not only two-dimensional and three-dimensional visually available images, but also digital representations of images inside the processor or a computer memory.

The system may further be configured to:

compare the image potentially representing a particle to one or more characteristics of particles; and identify the image as either representing or not representing a particle based on the comparison.

Thus, the system may be configured to automatically identify particles in the image such that the system may also count the particles.

The system may further comprise an air flow generator, the air flow generator being configured to:

receive the air comprising particles; and drive the air through the flow channels of the plurality of modules, thereby creating the flow of air through the flow channels.

The air flow generator may be any device capable of generating an air flow, e.g. a fan or a pump.

However, it should be understood that the system may also be a system which is configured to be connected to another device that drives the air. The system for detecting particles in air may e.g. be a system configured to be connected to a ventilation system.

The air flow channels of the modules and the air flow generator may be configured to force the flow of air through each of the flow channels of the modules to adopt a laminar flow profile in a region of the flow channel where the interference pattern is created.

A laminar flow profile may be advantageous as the path of the particles becomes predictable. The risk of double counting particles may thereby be reduced. However, it should be understood that a laminar flow profile is not a necessity.

A laminar flow profile may be achieved e.g. by setting a volumetric flow rate and mean speed of the flow of air, as well as hydraulic diameter and cross sectional area of the flow channel, such that the Reynolds number is below a threshold. In one embodiment the threshold may be 2100. In another embodiment the threshold may be 3000.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described hereinafter according to preferable embodiments, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
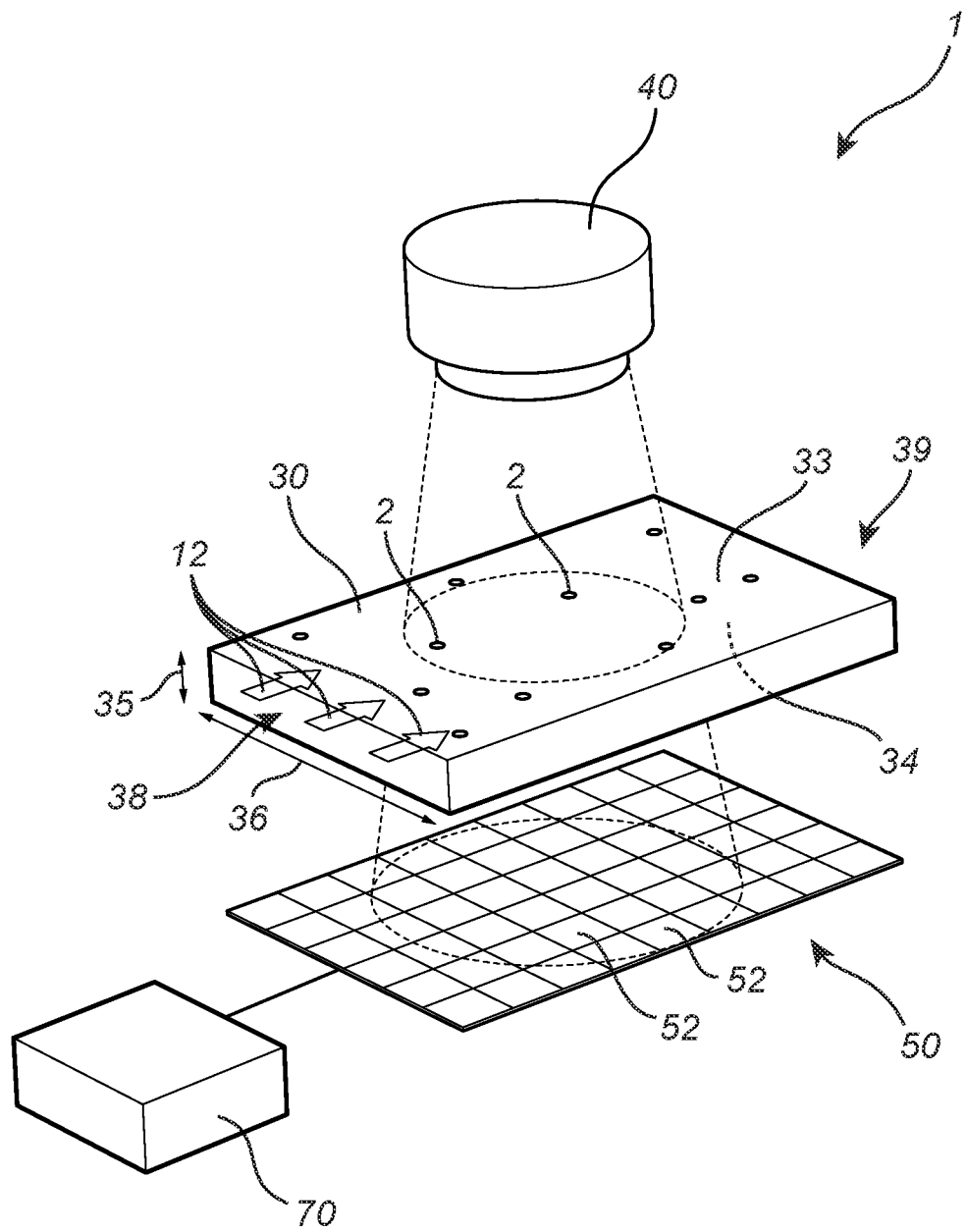
FIG. 1 is a device for detecting particles in air.

FIG. 1 illustrates a device 1 for detecting particles 2 in air. The device 1 comprises a flow channel 30 with an inlet 38 and an outlet 39. A flow of air 12, comprising particles 2, enters the flow channel 30 via the inlet 38. A light source 40 is configured to illuminate the particles 2 as they pass through the flow channel 30. The light source 40 may herein be a coherent light source 40 or a partially coherent light source 40. The light source 40 may be a laser or a light emitting diode.

As the particles 2 are illuminated an interference pattern is formed on an image sensor 50. The image sensor 50 comprises a plurality of photo-sensitive elements 52 configured to detect incident light. The image sensor 50 may herein be a CCD or CMOS camera. The image sensor 50 may acquire a time-sequence of image frames of the changing interference pattern as particles 2 pass the image sensor 50.

The device 1 may be configured to set a relationship between a frame rate of the time-sequence of image frames and a velocity of the flow of air through the flow channel 30. For example, the frame rate may be such that the inverse of the frame rate is equal to the time it takes for a particle 2 to move from a point where the interference pattern first appears on the image sensor 50 to a point where the interference pattern disappears from the image sensor 50. This may correspond to zero overlap between consecutive frames. The inverse of the frame rate may also be shorter, this may correspond to a positive overlap between consecutive frames.

In the illustrated device 1 of FIG. 1, the light source 40 is arranged outside a first side wall 33 of the flow channel 30 and the image sensor 50 is arranged outside a second side wall 34 of the flow channel 30. The flow channel 30 is configured to provide a light path from the light source 40 to the image sensor 50 through the first side wall 33 of the flow channel 30, through the flow of liquid 32 in the flow channel 30, and through the second side wall 34. This may be accomplished e.g. using transparent first 33 and second 34 side walls.

The flow channel 30 may be a flow channel 30 with a depth 35 below the distance threshold, the depth 35 herein referring to the extension of the flow channel 30 in a direction defined by the direction of the light path. The flow channel 30 may further have a width 36 larger than the depth, the width herein referring to an extension orthogonal to the direction of the light path.

The light from the light source 40 going through the flow channel 30 forms an interference pattern on the imaging sensor 50. The interference pattern is herein formed by interference between light being scattered by the particles 2 in the flow of liquid 32 in the flow channel 30 and light from the light source 40 that has passed the flow channel 30 without being scattered by any particles 2.

In the illustrated embodiment, the non-scattered light from the light source 40, i.e. the reference light, is passed along a common optical path with the light being scattered by the particles 2, i.e. the object light. Thus, the interference pattern is formed within a wavefront passing the particles 2 and the flow channel 30 in a so-called in-line holography set-up.

As the SNR of the detected interference pattern may decrease with increasing distance between the image sensor 50 and the scattering particle 2, it may be advantageous if the distance between the inner surface of the first side wall 33 of the flow channel 30 and the image sensor 50 is below a distance threshold. It should therefore be understood that it may be advantageous with a flow channel 30 close to the image sensor 50, e.g. in immediate proximity of the image sensor. It should be understood that in this respect the figures should be interpreted as schematic illustrations, wherein the flow channel 30 is illustrated some distance away from the image sensor 50 for the sake of clarity. In order to provide a short distance between the image sensor 50 and the scattering particles 2 while at the same time imaging a reasonably large volume of liquid, it may be advantageous with a flow channel 30 that has a larger channel width 36 than the channel depth 35.

The device 1 further comprises a frame processor 70 configured to filter information in the time-sequence of image frames. The frame processor 70 identifies pixels of interest in the time-sequence of image frames, wherein the pixels of interest picture an interference pattern potentially representing a particle in the flow of air.

The frame processor 70 may use a differential image process to identify pixels of interest. The differential image process may identify a pixel as a pixel of interest if the intensity represented by the pixel has changed. For example, the frame processor 70 may receive a first image frame from the time-sequence of image frames. The frame processor 70 may then subtract a reference frame from the first image frame to produce a differential image frame. If nothing has changed compared to the reference frame, all pixels of the differential image frame may have a value of zero or a value below a threshold, the threshold corresponding to natural or expected intensity fluctuations. However, if a subset of the pixels have a value above the threshold, this may indicate that the pixels are part of an interference pattern that represent a particle 2. The pixels of interest identified by the frame processor 70 may then be the pixels of the first image frame that correspond to the pixels in the differential image frame with above threshold values. Also other pixels may be identified as pixels of interest. For example, the pixels of interest may form a rectangle comprising the pixels of the first image frame that correspond to the pixels in the differential image frame with above threshold values. The entire first image may also be identified as pixels of interest if e.g. a significant number of pixels in the differential image frame has above threshold values. This may still reduce the data which need to be subjected to digital holographic reconstruction if e.g. only a fraction of the image frames in the time-sequence represent a particle. Once the pixels have been identified as pixels of interest they may be outputted by the frame processor 70.

The identified pixels of interest that are outputted may then be subjected to digital holographic reconstruction, either by the device 1 itself or by a system 100 which the device 1 is part of.

Figure 2:
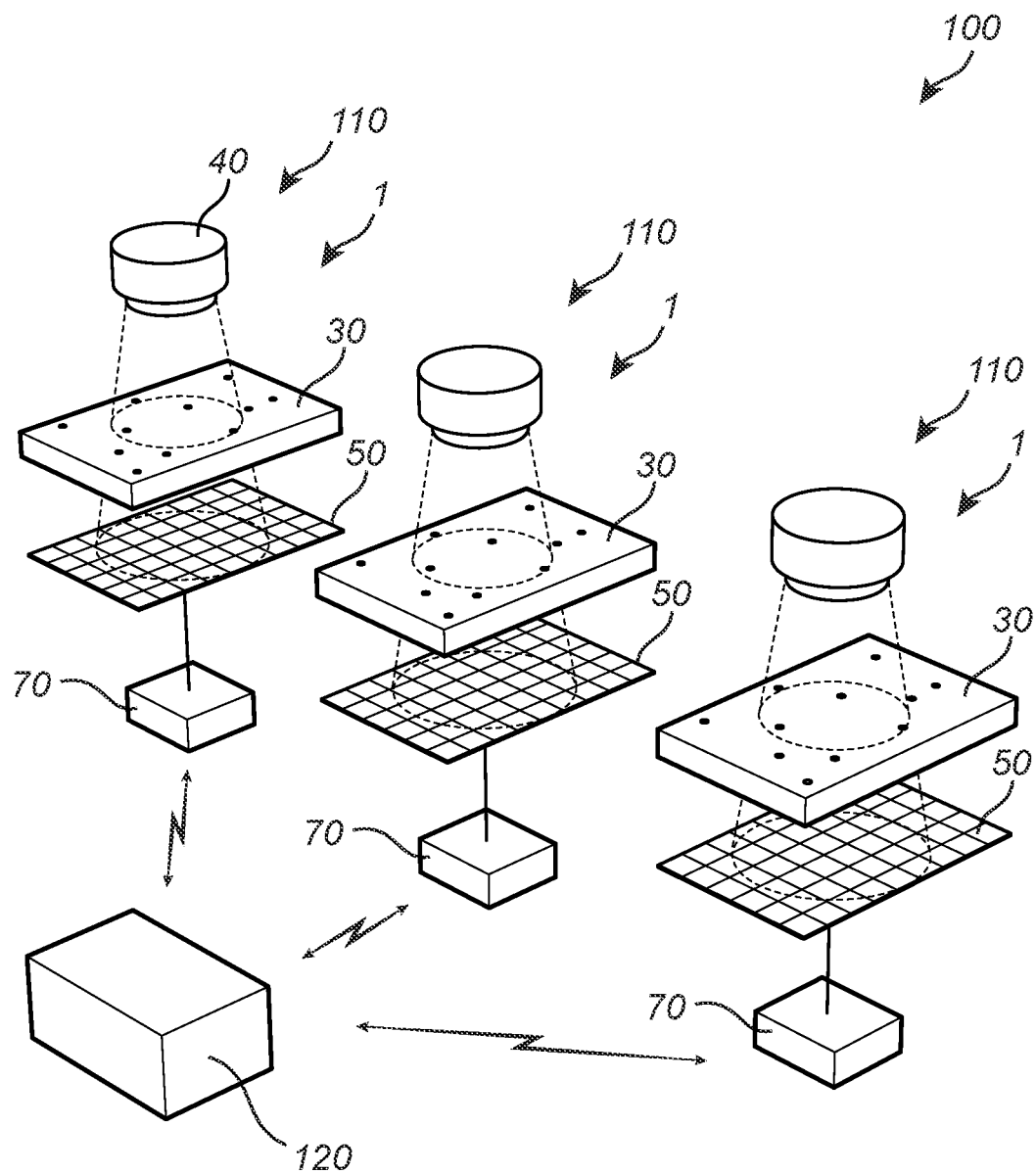
FIG. 2 is a system for detecting particles in air.
Figure 3:
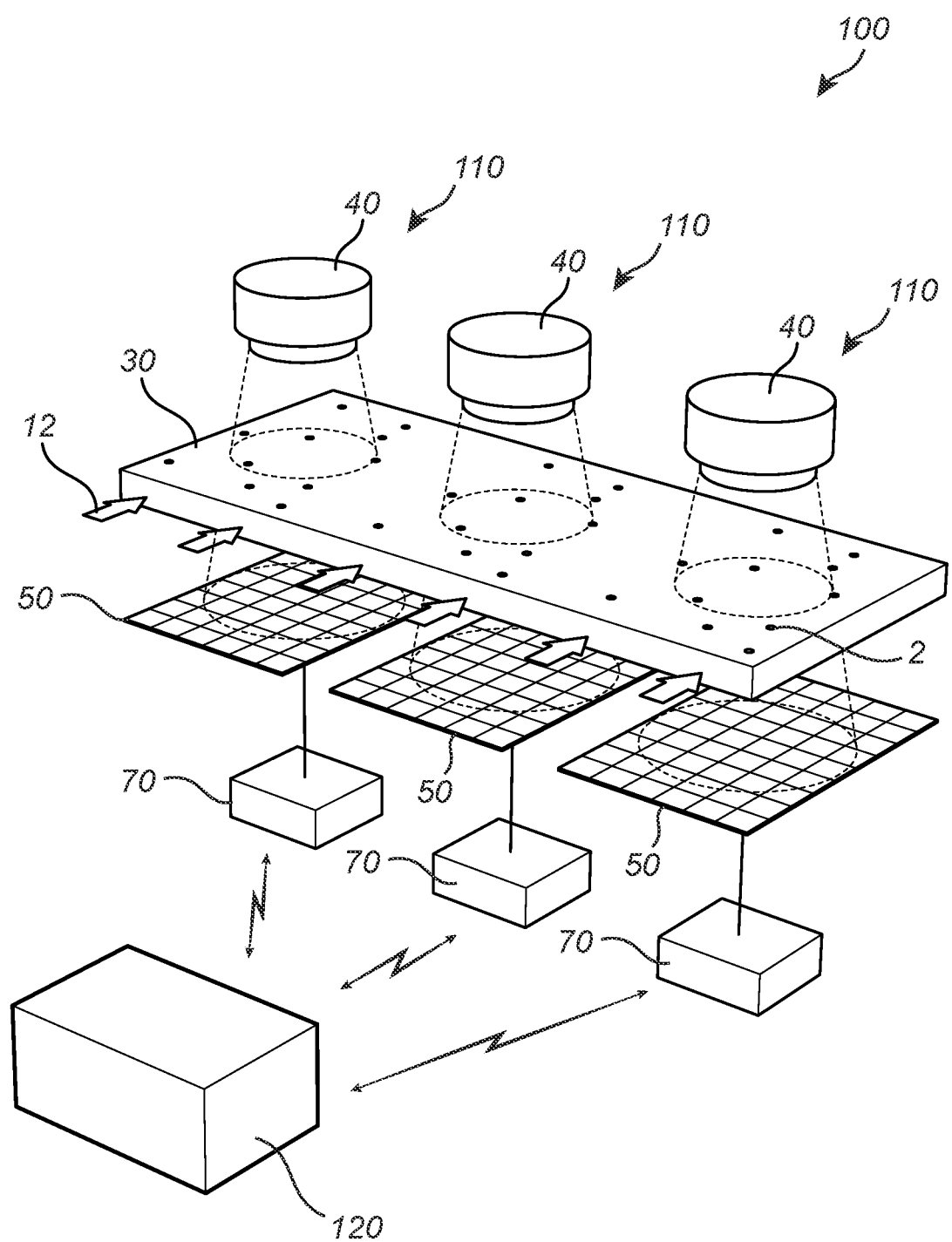
FIG. 3 is a system for detecting particles in air.

Examples of such a system 100 are illustrated in FIGS. 2 and 3. The illustrated systems 100 comprise: a plurality of modules 110, each module 110 comprising a device 1, and a processor 120 configured to collect data from each of the plurality of modules 110 for post-processing. Each module 110 may have its own flow channel 30, light source 40, image sensor 50 and frame processor 70 as illustrated in FIG. 2. However, some components may be shared among the modules 110. For example, two or more modules 110 may share the same flow channel 30, as illustrated in FIG. 3.

In the figures the processor 120 is illustrated as a unit separate from the frame processors 70. However, the processor 120 may alternatively be one of the frame processors 70.

Either the processor 120 of the system or a frame processor 70 of a device 1 within the system may be configured to perform digital holographic reconstruction on the pixels of interest to produce an image potentially representing a particle. Any suitable algorithm for performing the digital holographic reconstruction may be used, as known to the person skilled in the art, including a Gerchberg-Saxton algorithm or multi-acquisition (multi-depth and/or multi-wavelength) for phase retrieval, or reconstruction based on angular spectrum diffraction by means of Gabor wavelet transform.

The processor 120, the frame processor 70, or another processor, may be configured to compare the image potentially representing a particle to one or more characteristics of particles.

The processor 120, the frame processor 70, or another processor, may be configured to identify the image as either representing or not representing a particle.

Furthermore, identified images representing particles may be counted or several particles within an image counted. A particle concentration may be calculated based on counted particles and a volume of the air that has passed through the system together with the counted particles.

Figure 4:
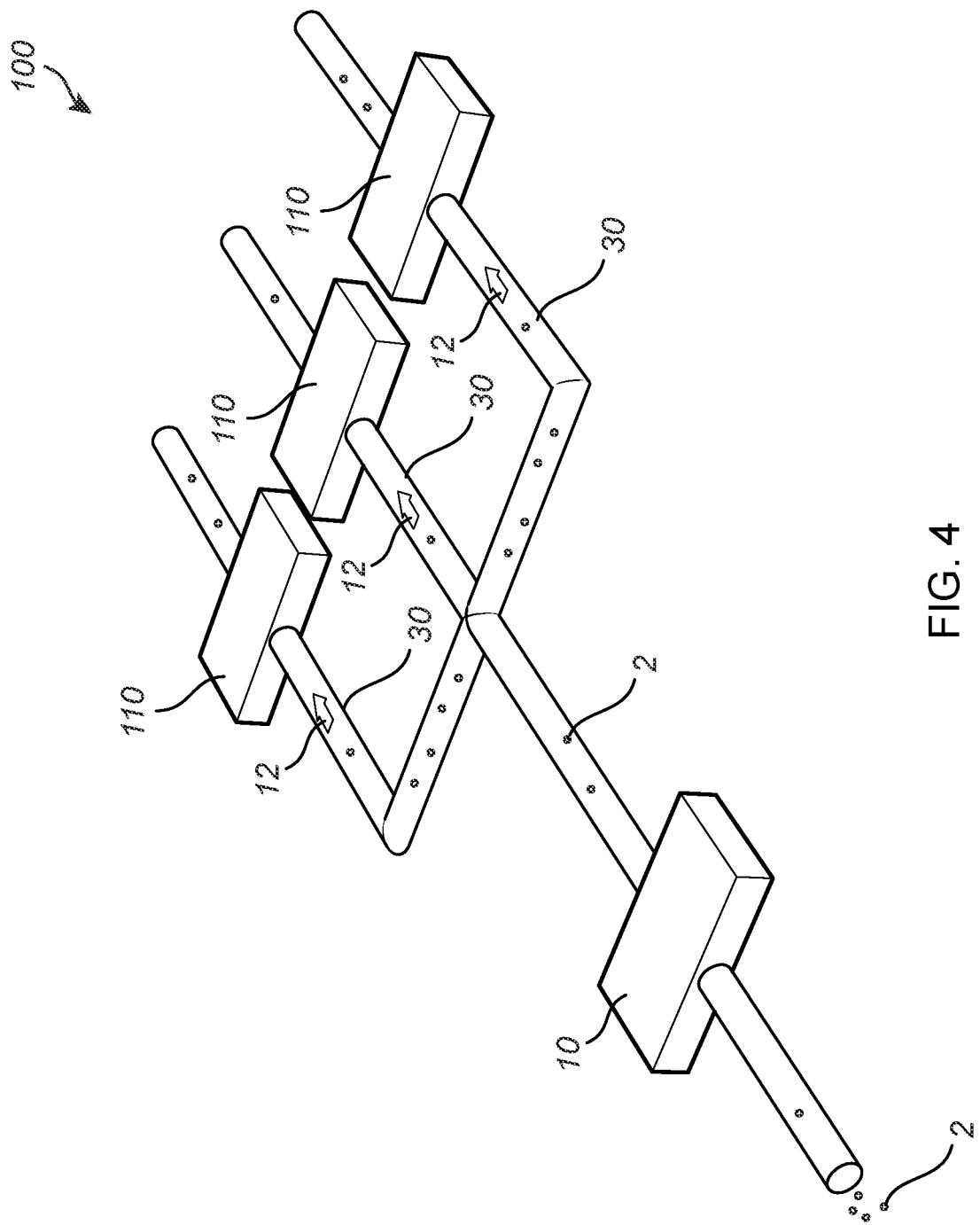
FIG. 4 is a system for detecting particles in air.

The system may be configured to be connected to another device that drives the air through the system. However, the system may also comprise its own air flow generator 10, as illustrated in FIG. 4. The air flow generator 10 may pump or blow air together with particles 2 in the air through the modules 110 of the system 100. In order to calculate a particle concentration it may be necessary to know not only how many particles has passed through the system but also the volume of air that has passed through the system. The volume may e.g. be given by a volumetric flow rate, the time period of the measurement and the dimensions of the flow channel 30 that each image sensor 50 covers in one image frame. The volumetric flow rate may be obtained from the air flow generator 10. However, the volumetric flow rate may also be measured by the system 100, regardless of whether it comprises an air flow generator. For example, the system may comprise a flow rate meter. The system may also deduce a volumetric flow rate from the time-sequence of image frames. If two consecutive image frames have a positive overlap the same particle may be seen in the digital holographic reconstruction of both image frames, but at different positions within the reconstructed frame. This information may be used to deduce a particle speed and thus also a volumetric flow rate.

The system 100 may be implemented in a number of ways. One example system 100, in no way limiting to the scope of this application, is described below.

In the example system 100 each module 110 comprises an image sensor 50 of 2048×2048 photo-sensitive elements 52, each photo-sensitive element 52 having a size of 5.5 μm×5.5 μm. Such an image sensor 50 may be a CMOSIS CMV4000 sensor. The image sensor 50 may be used at a frame rate of 150 frames per second and operated in global shutter mode to avoid image blurring. A flow channel 30 is situated less than 500 μm above the image sensor 50. The dimensions of the flow channel 30 may be optimized to achieve good quality imaging (after digital holographic reconstruction of the interference patterns) and maximize the throughput of the unit, given the frame-rate of the sensor. For example, a cell of 10 mm×10 mm with thickness of 2 mm can be used to achieve good imaging quality, wherein the cell is the imaged part of the flow channel 30. On the side of the cell opposite to the image sensor 50 is a light source 40 providing at least partially coherent illumination to create a holographic recording of the air and particles flowing through the cell.

Such module 110 would achieve an air-flow of 30000 mm$^3$ per second if no overlap between frames is required. In the case of a 33% positive overlap between frames, the module 110 could flow 10000 mm$^3$ of air per second and therefore around 0.6 l of air per minute. A system 100 of 67 air-flow imaging modules would give a 40 l per minute throughput, which is estimated to give statistically relevant data for pollen in air.

In the example system 100, each module 110 comprises a frame processor 70 that filters the information from the image sensor 50 of the module 110. The frame processor 70 may be configured to handle filtering of at least 150 4 MB image frames per second. The frame processor 70 may remove the empty image frames or, if optimized further, only keep the sub-frames or regions of interest of the image frames. A reduction factor of 1000-10000 in data transfer requirement may be achieved at this stage, e.g. 150×4 MB of data may become a mere 0.6 MB/s data rate, per module 110. The example system further comprises a processor 120 configured to receive at least 40 MB/s (67×0.6) of image frame data and perform digital holographic reconstruction on this data.

The embodiments of the inventive concept presented above may be applied for a number of different purposes aiming at monitoring particles in interior and exterior air. The particles may be any type of air-borne particulate matter such as pollen, dust, soot, air-borne bacteria, or fungi. There is provided a device for detecting particles in air. The device may further be configured to determine if the collected particles are particles of interest. The concept allows a high measurement frequency and has a potential of performing automated measurements. Further, it may be capable of classifying or determining the type of particle collected.

Outdoor applications may be monitoring of exterior air quality for detection of pollen, dust, soot, or other pollutants.

According to an embodiment, a device for detecting pollen in air is provided. Thanks to the present inventive concept, pollen levels in exterior air may be monitored with a high frequency, and with the potential of performing automated measurements. It may also provide measurement stations at a low cost, which may lead to an increased number of measurement stations. This in turn may have the potential of providing more up-to-date and geographically more precise information on pollen levels in exterior air, which may be valuable to people that are affected by pollen allergies.

Indoor applications may be monitoring interior air quality for detection of molds, fungi, pollen, dust, or bacteria. Such monitoring can be applied in a variety of locations, such as public shopping malls, hospitals or laboratories.

Monitoring of air-borne bacteria may be of particular importance in aseptic environments, such as the manufacturing environment for pharmaceutical production. Monitoring of air-borne bacteria in interior air may be required to ensure a sterile manufacturing environment.

Presence of bacteria in the manufacturing environment of pharmaceutical products may contaminate the products and force the products manufactured in a contaminated environment to be disposed. Thus, early detection of presence of bacteria may be highly advantageous, because if production in a contaminated environment is continued, a large quantity of products may have to go to waste.

According to an embodiment, a device for detecting bacteria in air is provided. Thanks to the present inventive concept, bacterial levels in interior air may be monitored with a high frequency, and with the potential of providing results in real-time. As soon as bacterial levels are detected, the production may be stopped such that no or very little of the pharmaceutical products will go to waste.

Moreover, the real-time aspect of the present inventive concept further allows for monitoring of development of bacterial levels over time, by acquiring time sequences of measurements. In this manner bacterial growth may be studied.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device, said device being an air particle detector, said device comprising:
a flow channel comprising an inlet and an outlet, wherein the flow channel is configured to allow a flow of air comprising particles through the flow channel from the inlet to the outlet;
an air flow generator, the air flow generator being configured to flow at least 10000 mm$^3$ of air per second through the flow channel;
a light source configured to illuminate the particles in the flow of air, such that an interference pattern is formed by interference between light being scattered by the particles and non-scattered light from the light source;
an image sensor comprising a plurality of photo-sensitive elements configured to detect incident light, the image sensor being configured to detect the interference pattern, and wherein the image sensor is configured to acquire a time-sequence of image frames, each image frame comprising a plurality of pixels, each pixel representing an intensity of light as detected by a photo-sensitive element of the plurality of photo-sensitive elements; and
a frame processor configured to filter information in the time-sequence of image frames, wherein said filtering comprises:
identifying pixels of interest in the time-sequence of image frames, said pixels of interest picturing an interference pattern potentially representing a particle in the flow of air,
outputting said identified pixels of interest for performing digital holographic reconstruction on the identified pixels of interest, and
discarding pixels not identified as pixels of interest before holographic reconstruction.

2. The device according to claim 1, wherein the light source is configured to emit at least partially coherent light.

3. The device according to claim 1, wherein:
the light source is arranged outside a first side wall of the flow channel;
the image sensor is arranged outside a second side wall of the flow channel; and
the flow channel is configured to provide a light path from the light source to the image sensor through the first side wall of the flow channel, through the flow of air in the flow channel and through the second side wall.

4. The device according to claim 1, wherein the frame processor is further configured to perform the identifying of pixels of interest in the time-sequence of image frames using a differential image process, the differential image process identifying a pixel as a pixel of interest if the intensity of light represented by the pixel has changed.

5. The device according to claim 4, wherein the differential image process comprises:
receiving a first image frame from the time-sequence of image frames;
subtracting a reference frame from the first image frame to produce a differential image frame, each pixel of the differential image frame having an intensity related to a difference between the intensities of the corresponding pixels in the first image frame and the reference frame; and
identifying pixels in the differential image frame which exceed a threshold as pixels of interest in the time-sequence of image frames.

6. The device according to claim 1, the device being further configured to set a relationship between a frame rate of the time-sequence of image frames and a velocity of the flow of air through the flow channel, wherein the relationship is set to control an overlap between consecutive frames in the time-sequence of image frames.

7. A system for detecting particles in air, said system comprising:
a plurality of modules, each module comprising a device according to claim 1;
a processor configured to collect data from each of the plurality of modules for post-processing.

8. The system according to claim 7, the system being configured to perform digital holographic reconstruction on the identified pixels of interest output by the frame processor, thereby transforming the pixels of interest from an interference pattern potentially representing a particle to an image potentially representing a particle.

9. The system according to claim 8, the system being further configured to:
compare the image potentially representing a particle to one or more characteristics of particles; and
identify the image as either representing or not representing a particle based on the comparison.

10. The system according to claim 7, the system further comprising an air flow generator, the air flow generator being configured to:
receive the air comprising particles; and
drive the air through the flow channels of the plurality of modules, thereby creating the flow of air through the flow channels.

11. The system according to claim 10, wherein the air flow channels of the modules and the air flow generator are further configured to force the flow of air in at least one of the flow channels of the modules to adopt a laminar flow profile in a region of the flow channel where the interference pattern is created.

* * * * *